Figure 1:
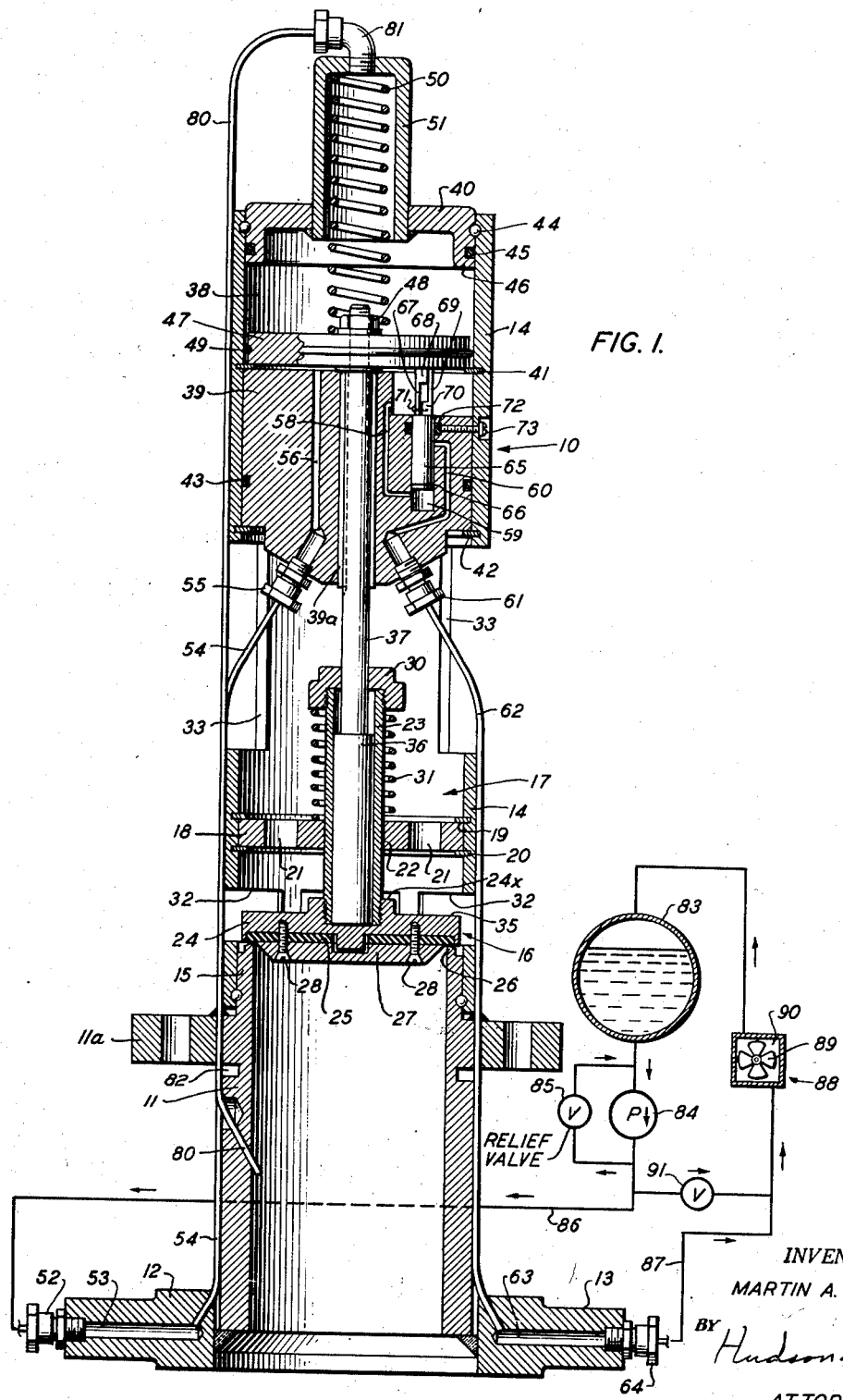

May 3, 1955

M. A. RYAN 2,707,378

EXCESS FLOW VALVE

Filed May 26, 1952

2 Sheets-Sheet 1

INVENTOR.
MARTIN A. RYAN
BY Hudson & Young
ATTORNEYS

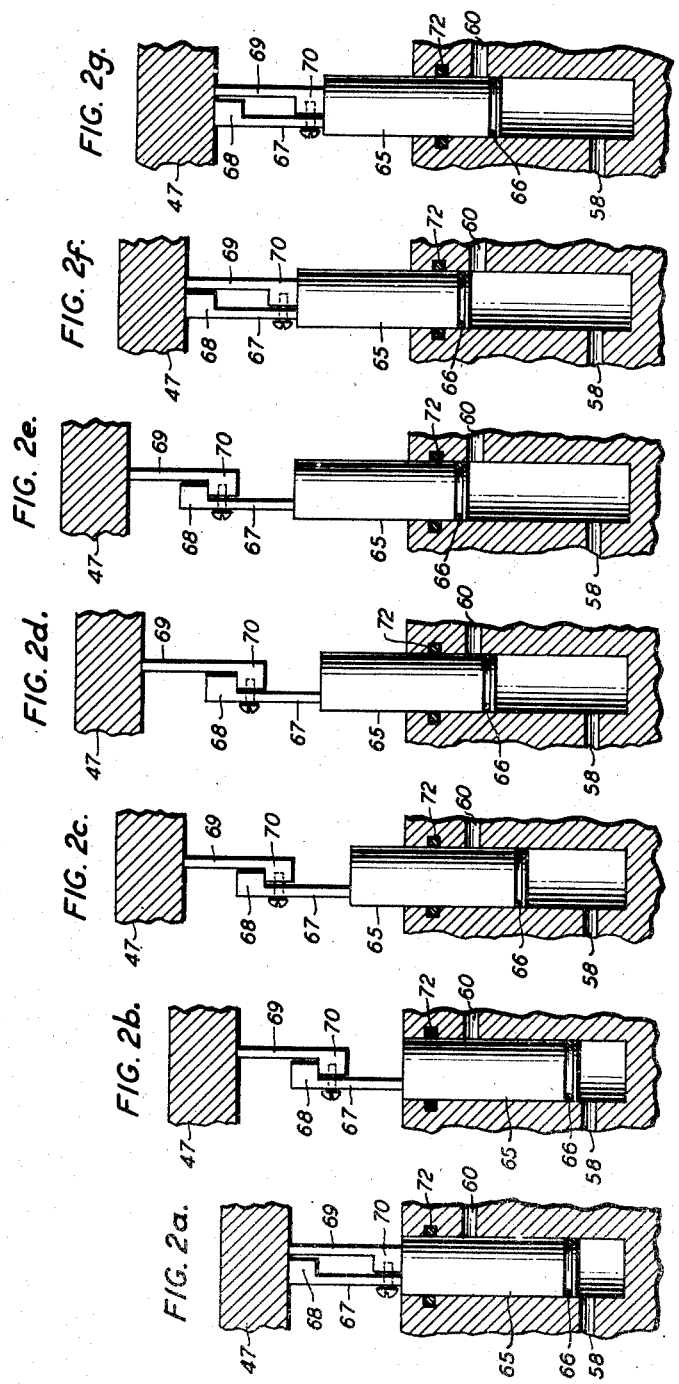

United States Patent Office 2,707,378
Patented May 3, 1955

2,707,378

EXCESS FLOW VALVE

Martin A. Ryan, Bartlesville, Okla., assignor to Phillips Petroleum Company, a corporation of Delaware Application May 26, 1952, Serial No. 289,987

13 Claims. (Cl. 62—1)

This invention relates to valves. In one specific aspect, it relates to valve assemblies for removing volatile fluids, such as liquefied petroleum gas, from storage vessels.

In the handling of volatile fluids, particularly liquefied petroleum gas, many safety requirements must be met. For example, such materials must be stored in especially constructed tanks which are capable of withstanding the relatively high vapor pressures of these substances. When introducing material into the tank or removing it therefrom, it is necessary that the valve structures be provided with a number of different safety features.

The valve structure of this invention combines a number of the necessary safety features in a single unitary valve structure which is adapted for control by hydraulic fluid. The valve can be rapidly and positively opened or closed by proper regulation of the hydraulic fluid supply and, in the opened position, the structure has the additional function of performing as an excess flow valve, that is, a normally open valve which is closed when the amount of fluid flow therethrough becomes excessive. As an additional feature, the valve also incorporates a mechanism whereby, with the valve in closed position, there is a positive sealing action should the fluid pressure outside the tank become greater than the fluid pressure inside the tank to which the valve is attached.

In order that the numerous functions of the valve can be properly performed, I have devised a novel arrangement for bleeding hydraulic fluid from a chamber in which moves a piston controlling the valve operation. Finally, I have provided a structure whereby, should the valve casing be broken by a severe shock, the valve is automatically enclosed thereby preventing the escape of fluid from the storage vessel.

It is an object of the invention to provide an improved valve which combines the functions of a positive-closing pump-opened valve with a quick-closing cut-off valve, excess flow valve, and back flow check valve.

It is a further object to provide a valve which is simple in construction, reliable in operation, and economical to manufacture.

Various other objects, advantages, and features of the invention will become apparent from the following detailed description taken in conjunction with the accompanying drawings, in which:

Figure 1 is a vertical sectional view, partially in elevation, of a valve constructed in accordance with the invention; and Figures 2a to 2g, inclusive, are views illustrating the operation of a lost-motion connection forming a part of the valve structure.

Referring now to the drawings in detail, and particularly to Figure 1, the valve comprises a generally cylindrical casing 10, one end 11 of which is adapted to be attached to a conduit for withdrawing fluids, such as liquefied petroleum gas, from a storage vessel. To this end, the end portion 11 is provided with a flange 11a whereby the casing is attached to the storage vessel and it also has an inlet fitting 12 and an outlet fitting 13 for hydraulic lines to be hereinafter described in detail.

At its other end, the casing 10 is shaped to form a housing 14 enclosing a valve-actuating assembly, it being understood that the housing 14 is normally mounted inside the storage vessel containing the fluids to be dispensed.

The end portion 11, hereinafter termed the downstream end of the casing, is constructed and arranged to define a valve seat 15 with which cooperates a valve head 16 forming a part of a valve head assembly 17. This assembly includes a spider 18 secured between two mounting rings 19 and 20 which fit into complementary slots in the adjacent portion of the housing 14. The spider 18 has a number of circumferentially arranged openings 21 and an enlarged central opening 22 within which is slidably received a tubular valve stem 23. It will be evident that the stem 23 is mounted for longitudinal movement toward and away from the valve seat 15.

The valve head 16 includes a flanged disk 24 threaded to the end of stem 23 adjacent valve seat 15, and an annular resilient sealing gasket 25 mounted within the flanged portion of the disk, the gasket being engageable with a sharp ridge portion 26 formed upon the valve seat 15. The gasket 25 is held in position upon the disk 24 by a plate 27 secured to the disk 24 by bolts 28. At the end opposite valve head 16, the stem 23 carries an end cap 30, and a spring 31 is secured to and mounted between the end cap 30 and the central portion of spider 18.

The strength or stiffness of spring 31 is such that the valve stem and valve head are normally positioned with a flange 24x on the valve head engaging the spider 18. In this position, fluid can flow from the interior of the storage vessel through a set of openings 32 in the housing 14, thereby creating a pressure drop between the interior of the tank and downstream end 11 of the casing. The tank pressure is transmitted through a set of openings 33 into the interior of the housing 14 and, thence, to the upper surface 35 of the valve head. Should the rate of flow of the fluid become excessive, the tank pressure effective against the surface 35 will cause the valve head 16 to move into engagement with the seat 15 against the force exerted by the spring 31. Accordingly, when the position of the valve head is under the control of the spring 31, the assembly functions as an excess flow valve. It will be understood that the valve remains closed until it is opened by application of hydraulic pressure in the manner hereinafter described.

In accordance with the invention, the valve structure can also be moved to opened or closed position under the control of hydraulic fluid independently of the spring 31 and, combined with this feature, a positive sealing action of the valve in closed position is obtained should the pressure in the downstream end 11 of the casing become higher than the tank pressure. To this end, a plunger 36 is slidably mounted within the tubular stem 23 and this plunger, in turn, is secured to a piston rod 37 which extends axially to a piston chamber 38 defined by the housing 14, a metal insert 39 and an end cap 40 secured to the housing. It will be noted that the piston rod 37 is provided with splines 39a within the insert 39 so as to permit axial movement of the piston rod while preventing any angular or twisting movement thereof. Insert 39 is of generally cylindrical configuration and it is mounted between two rings 41 and 42 secured within suitable recesses in the housing, an annular sealing gasket 43 being provided at approximately the middle region of the insert. The end cap 40 is secured to the housing by a ball joint 44 and is provided with an annular sealing gasket 45 fitted within a flange 46.

As stated, the piston rod 37 extends into the chamber 38, and this rod carries a piston or disk 47 secured to a threaded upper portion of the piston rod by a nut 48. The piston 47 is provided with an annular sealing gasket 49. It will be noted that the piston is normally urged into engagement with the ring 41 by a spring 50 secured to and extending between the piston and the end of a relatively small cylindrical housing 51 protruding from the end cap 40. The spring 50 is stronger than the spring 31 and, consequently, is able to force the piston downwardly. As a result, the plunger 36 engages the disk 24 of valve head 16 and forces it into engagement with the valve seat 15.

Structure is provided for admitting hydraulic fluid to the piston chamber between insert 39 and the piston 47, this structure including a fitting 52 in hydraulic inlet means 12, a bore 53, a hydraulic line 54, a fitting 55 and a bore 56 formed in the insert 39. Assuming that the pressure in the tank is greater than the pressure in the downstream part 11 of the casing, when hydraulic fluid is admitted under pressure to the piston chamber, the piston is moved upwardly into engagement with the flange 46 of end cap 40, it being understood that the pressure of the hydraulic fluid is sufficient to overcome the force exerted by the spring 50. Such movement of the piston causes an upward movement of the piston rod 37 and plunger 36, the plunger engaging the end cap 30 with the result that the valve stem and valve head are lifted a short distance away from the valve seat 15. Thereupon, spring 31 moves the valve head to the fully open position with flange 24x in engagement with spider 18. If the pressure in casing section 11 is equal to or exceeds the tank pressure, the spring 31 and/or the pressure differential causes the valve head to remain in engagement with the lower end of the plunger 36 as the piston is raised.

With the piston in the last described position, however, the valve could not function as an excess flow valve since the plunger 36 would prevent the valve head from moving to a fully closed position, responsive to an excessive pressure differential on opposite sides of the valve head. Therefore, in accordance with the invention, a portion of the hydraulic fluid is bled from the piston chamber to permit downward movement of the plunger to a position where it will not prevent closure of the valve responsive to an excess flow condition.

To this end, I have provided a bleed passageway for removing hydraulic fluid from the piston chamber, this passageway including a bore 58, one end of which communicates with the lower portion of piston chamber 38 and the other end of which communicates with an intermediate region of a barrel 59 formed in the insert 39, the barrel extending longitudinally of the housing 14 and being radially spaced from the piston rod 37. Also communicating with the intermediate region of the barrel 59 is a bore 60 which communicates through a fitting 61 with a bleed line 62. This bleed line, in turn, communicates with a bore 63 in hydraulic outlet means 13 and a fitting 64.

Movably mounted in the barrel 59 is a cylindrical member 65 which has an annular sealing gasket 66 at the lower end thereof and a longitudinally protruding arm 67 at the upper end thereof, this arm having hook shaped end portion 68. Depending from the piston 47 is a downwardly protruding arm 69 having a hook shaped end portion 70 which is adapted to engage and cooperate with hook shaped end portion 68. Hook shaped portion 70 also carries a bolt 71 which extends through a suitable slot, not shown, in arm 67 to prevent the arms 67, 69 from moving out of register. The cylindrical member 65 is engaged by a ring 72 of packing material which is forced into frictional engagement with the cylindrical member 65 by an adjusting bolt 73 accessible from the outside of the housing 14.

As previously stated, when hydraulic fluid is pumped into the piston chamber, the piston 47 is moved upwardly into engagement with flange 46, thereby causing spring 31 to lift the valve head to a position where flange 24x engages the spider 18. During such movement of the piston, the arm 69 moves successively to the positions illustrated in Figures 2a to 2e, inclusive, from which it will be noted that the upward movement of arm 69 causes hooked end 70 to move upwardly until it engages the hooked end 68 of arm 67. Thereupon, the hooked ends of the arms are engaged and cylindrical member 65 is lifted successively to the positions shown by Figures 2b to 2e the sealing gasket 66 being disposed above the cooperating ports 58 and 60 in the latter figure. Thereupon, hydraulic fluid begins to bleed from the valve through the ports 58, 60 and bleed line 62. As long as the pumping of hydraulic fluid to the piston chamber is continued, this bleeding action produces no effect since the fluid is bled away at a slower rate than it is pumped to the piston chamber. However, when the pumping action is terminated, the continued bleeding of the hydraulic fluid causes a downward movement of the piston 47.

As the piston moves from the position shown in Figure 2e to the position shown in Figure 2f, the member 65 remains in its upper position due to the frictional engagement of packing material 72 with cylindrical member 65. Accordingly, the bleeding of hydraulic fluid continues as does the downward movement of the piston. As the movement continues, the piston 47 engages hooked end 68 and forces cylindrical member 65 to move downwardly until the sealing gasket 66 is positioned below the port 60, at which time bleeding of the hydraulic fluid is stopped and the downward movement of the piston is terminated. With the piston in the position shown by Figure 2g, plunger 36, Figure 1, has been moved downwardly a sufficient distance that it will not interfere with a closing action of the valve head 24 caused by an excess flow of fluid therethrough. Consequently, the valve functions as an excess flow valve. When it is desired to close the valve, the remainder of the hydraulic fluid is drained from the piston chamber through line 54 and piston 47 is moved into engagement with ring 14 by spring 50, thereby moving the plunger 36 downwardly and causing the valve head 16 to engage the valve seat.

The valve structure of my invention also functions as a back flow check valve. That is, when the valve is in closed position, there will be no tendency for the valve to open should the pressure in the downstream part 11 of the casing exceed the tank pressure. To this end, a line 80 communicates with the downstream part 11 of the casing and through a fitting 81 with the housing 51 so that, with the valve in closed position, the pressure in the downstream part of the casing is transmitted to and is effective upon the upper surface of the piston 47. Since the cross-sectional area of the piston 47 is greater than that of the valve head, the excessive pressure in the downstream part of the casing causes an additional sealing action which tends to close the valve more tightly rather than to cause opening of the valve.

The valve structure also functions as a quick-closing cut-off valve in the event that the lower part of the casing should be broken off by a severe shock. To this end, I have provided an annular slot 82 in the downstream part 11 of the casing, this slot being positioned between the valve seat and the lower end of the valve structure. Should fracture of the valve occur, the casing will break at weakened portion 82 and such break inevitably fractures the relatively fragile hydraulic lines leading to the piston chamber. As a result, spring 50 is immediately effective to cause closure of the valve and prevent escape of fluid from the tank.

I have also provided a visual indicator in the hydraulic fluid pumping system associated with the valve to the end that the operator can follow the valve operation and determine whether or not it is operating correctly. The hydraulic fluid for operating the valve is stored in a vessel 83 from which hydraulic fluid is withdrawn by a pump 84 bypassed by a relief valve 85. The fluid is pumped through an inlet line 86 to the inlet fitting 52. Bleed line 62 and its associated fitting 64 communicate with a conduit 87 which, in turn, leads back to the tank 83 through a flow indicator 88. This flow indicator can consist of a spinner 89 positioned in the path of fluid flow, movement of the spinner being observed through a transparent window 90. The hydraulic control system is completed by a valve 91 connecting line 86 and conduit 87.

Assuming that the valve 91 is in closed position, pumping is initiated by energizing unit 84 with the result that hydraulic fluid flows into the lower part of piston chamber 38. During the upward movement of the piston, the port 60 is closed by cylindrical member 65 so that there is no flow of fluid through bleed lines 62 and 87 and the indicator 88. As the piston reaches its upper position, the port 60 is uncovered as shown by Figure 2e, with the result that flow of hydraulic fluid is initiated through the bleed lines 62, 87 and the spinner 89 begins to rotate. Thereupon, the operator is informed that the valve is in open position and that pumping of hydraulic fluid can be terminated. When this occurs, the pump 84 is stopped and bleeding of the hydraulic fluid continues with resultant downward movement of the piston 47. The bleeding of fluid and the resultant rotation of the spinner 89 continue until cylindrical member 65 reaches the position shown in Figure 2g wherein the port 60 is closed by cylindrical member 65. At this time, the bleeding of hydraulic fluid is terminated and no further rotation of spinner 89 occurs. This informs the operator that the downward movement of the piston has stopped and that the valve is now in position to function as an excess flow valve. When it is desired to close the valve, control valve 91 is opened so that fluid can drain from line 86 through indicator 88 to the tank 83. This again produces a flow of hydraulic fluid through the spinner which continues until the hydraulic fluid is completely removed from the piston chamber by the action of spring 50 upon the piston and the resultant downward movement thereof. When the piston engages ring 41, the draining of fluid is stopped and the resultant stoppage of indicator 88 shows the operator that the valve is in closed position.

It will be apparent that I have achieved the objects of my invention in providing a unitary valve structure for use with a vessel for storing fluids, such as liquefied petroleum gas. The valve is quickly and positively opened by supplying hydraulic fluid to the piston chamber, thereby causing the valve head to move upwardly into engagement with the spider 18, in which position the valve head and seat cooperate to form an excess flow valve. Thereupon, the piston moves downwardly a short distance due to the bleeding of the hydraulic fluid from the piston chamber so that plunger 36 assumes an intermediate position where it will not interfere with closure of the valve due to excess flow of fluid therethrough. The valve is rapidly closed by draining the hydraulic fluid from the piston chamber through line 86 by opening valve 91. In its closed position, an excessive pressure in the downstream part 11 of the casing does not cause the valve to open due to the transmission of such pressure to the upper surface of the piston through line 80 and fitting 81. Should the end portion 11 of the valve be broken off outside the vessel by a severe shock, the valve will be automatically closed so that the structure also functions as a quick-closing cut-off valve. Finally, the action of the visual indicator 88 informs the operator of the condition of the valve (1) when the piston reaches its uppermost position in engagement with flange 46, thereby indicating that the pumping of hydraulic fluid can be terminated, (2) when the automatic bleeding of fluid from the piston chamber is terminated, thereby indicating that the valve is in readiness for operation as an excess flow valve, and (3) when the last of the hydraulic fluid has been drained from the piston chamber in the valve closing operation, thereby indicating complete closure of the valve.

While the invention has been described in connection with a present, preferred embodiment thereof, it will be understood that this description is illustrative only and is not intended to limit the invention.

I claim:

1. A valve comprising, in combination, a generally cylindrical metal casing, one end of said casing being constructed and arranged to define a valve seat, the other end of said casing defining a housing for a valve head assembly, a spider secured interiorly of said housing, a valve head assembly including a tubular stem mounted for axial movement in said spider toward and away from said valve seat, a valve head secured to said stem, and a spring urging said valve head to a position spaced from said valve seat, at which position a fluid pressure differential created by an excess flow of fluid from the housing toward said one end of the casing is adapted to force said valve head into engagement with said valve seat against the force of said spring, a plunger mounted for axial movement within said stem, a piston rod secured to said plunger, a piston secured to said rod which is movable longitudinally in a piston chamber defined by said casing, a line communicating with said chamber to admit hydraulic fluid thereto, thereby to move said piston in such direction as to cause the plunger to lift the valve head away from the valve seat, a valve control member movably mounted in said casing, a bleed port communicating with said piston chamber and controlled by the position of said member to bleed hydraulic fluid from the piston chamber, said member having a protruding arm, a protruding arm secured to said piston and cooperating with said first arm to form a lost motion connection therewith, and means frictionally engaging said member, said structure being arranged so that movement of the piston in such direction to lift the valve head causes said member to open said bleed port, the piston engaging said first arm upon a predetermined return movement of the piston in order to cause said member to close the bleed port when the piston reaches a preselected position.

2. A valve comprising, in combination, a generally cylindrical metal casing, one end of said casing being constructed and arranged to define a valve seat, the other end of said casing defining a housing for a valve head assembly, a spider secured interiorly of said housing, a valve head assembly including a tubular stem mounted for axial movement in said spider toward and away from said valve seat, a valve head secured to said stem, and a spring urging said valve head to a position spaced from said valve seat, at which position a fluid pressure differential created by an excess flow of fluid from the housing toward said one end of the casing is adapted to force said valve head into engagement with said valve seat against the force of said spring, a plunger movable axially within said stem, a piston rod secured to said plunger, a piston secured to said rod which is movable longitudinally in a piston chamber defined by said casing, a line communicating with said chamber to admit hydraulic fluid thereto, thereby to move said piston in such direction as to cause the plunger to lift the valve head away from the valve seat, means defining a longitudinally extending cylindrical barrel in said casing spaced from said piston rod and located between said piston and said valve head, a cylindrical member movable in said barrel toward and away from said piston, one end of said member having a hooked arm protruding therefrom and extending toward said piston, the other end of said member being encircled by a sealing gasket, cooperating ports communicating with an intermediate region of said barrel, one of said cooperating ports leading to said piston chamber and the other cooperating port leading to a bleed conduit, a hooked arm depending from said piston, the hooked portion of said last-mentioned arm cooperating with the hooked portion of the arm extending from said cylindrical member to form a lost motion connection therewith, and means frictionally engaging said cylindrical member.

3. A valve comprising, in combination, a generally cylindrical metal casing, one end of said casing being constructed and arranged to define a valve seat, the other end of said casing defining a housing for a valve head assembly, a spider secured interiorly of said housing, a valve head assembly including a tubular stem mounted for axial movement in said spider toward and away from said valve seat, a valve head secured to said stem, and a spring urging said valve head to a position spaced from said valve seat, at which position a fluid pressure differential created by an excess flow of fluid from the housing toward said one end of the casing is adapted to force said valve head into engagement with said valve seat against the force of said spring, a plunger movable axially within said stem, a piston rod secured to said plunger, a piston secured to said rod which is movable longitudinally in a piston chamber defined by said casing, a line communicating with said chamber to admit hydraulic fluid thereto, thereby to move said piston in such direction as to cause the plunger to lift the valve head away from the valve seat, means defining a longitudinally extending cylindrical barrel in said casing spaced from said piston rod and located between said piston and said valve head, a cylindrical member movable in said barrel toward and away from said piston, one end of said member having a hooked arm protruding therefrom and extending toward said piston, the other end of said member being encircled by a sealing gasket, cooperating ports communicating with an intermediate region of said barrel, one of said cooperating ports leading to said piston chamber and the other cooperating port leading to a bleed conduit, a hooked arm depending from said piston, the hooked portion of said last-mentioned arm cooperating with the hooked portion of the arm extending from said cylindrical member to form a lost motion connection therewith, a ring of packing material encircling said cylindrical member, and an adjusting screw engaging said ring of packing material to force it into frictional engagement with said cylindrical member.

4. A valve comprising, in combination, a generally cylindrical metal casing, one end of said casing being constructed and arranged to define a valve seat, the other end of said casing defining a housing for a valve head assembly, a spider secured interiorly of said housing, a valve head assembly including a tubular stem mounted for axial movement in said spider toward and away from said valve seat, a valve head secured to said stem, and a spring urging said valve head to a position spaced from said valve seat, at which position a fluid pressure differential created by an excess flow of fluid from the housing toward said one end of the casing is adapted to force said valve head into engagement with said valve seat against the force of said spring, a plunger movable axially within said stem, a piston rod secured to said plunger, a piston secured to said rod which is movable longitudinally in a piston chamber defined by said casing, a line communicating with said chamber to admit hydraulic fluid thereto, thereby to move said piston in such direction as to cause the plunger to lift the valve head away from the valve seat, means defining a longitudinally extending cylindrical barrel in said casing spaced from said piston rod and located between said piston and said valve head, a cylindrical member movable in said barrel toward and away from said piston, one end of said member having a hooked arm protruding therefrom and extending toward said piston, the other end of said member being encircled by a sealing gasket, cooperating ports communicating with an intermediate region of said barrel, one of said cooperating ports leading to said piston chamber and the other cooperating port leading to a bleed conduit, a hooked arm depending from said piston, the hooked portion of said last-mentioned arm cooperating with the hooked portion of the arm extending from said cylindrical member to form a lost motion connection therewith, a ring of packing material encircling said cylindrical member, an adjusting screw engaging said ring of packing material to force it into frictional engagement with said cylindrical member, said casing having an annular slot formed therein surrounding the casing downstream of the region of engagement of the valve head with the valve seat.

5. A valve comprising, in combination, an elongated valve casing, means for securing said casing to a container so that one end of said casing is positioned within said container, a valve seat in said casing, a support secured within said casing, a valve head mounted in said support for movement toward and away from said valve seat, an opening to the container in said one end of the casing, a spring connecting said valve head and said support and arranged to cause the valve head to assume a position spaced from said valve seat, the strength of said spring being adjusted so that an excess flow of fluid from said container through said opening, said valve seat, and the other end of said casing causes the valve head to move into engagement with the valve seat against the force of said spring, a pressure-receiving member slidable in a closed portion of said casing and connected to said valve head, the cross-sectional area of said member being greater than the cross-sectional area of said valve head, a conduit connecting the end of said closed portion remote from said valve head with said other end of the casing, an inlet conduit connected to the end of said closed portion adjacent said valve head, a source of hydraulic fluid, means including a pump connecting said source to said inlet conduit, a bleed conduit connected to said end of said closed portion adjacent said valve head, and a flow indicating device connected in said bleed conduit.

6. A valve comprising, in combination, an elongated valve casing, means for securing said casing to a container so that one end of said casing is positioned within said container, a valve seat in said casing, a support secured within said casing, a valve head mounted in said support for movement toward and away from said valve seat, an opening to the container in said one end of the casing, a spring connecting said valve head and said support and arranged to cause the valve head to assume a position spaced from said valve seat, the strength of said spring being adjusted so that an excess flow of fluid from said container through said opening, said valve seat, and the other end of said casing causes the valve head to move into engagement with the valve seat against the force of said spring, a pressure-receiving member slidable in a closed portion of said casing, a plunger slidable within said portion of the casing having one end thereof connected to said pressure-receiving member, and having its other end engageable with said valve head, the cross-sectional area of said member being greater than the cross-sectional area of said valve head, a conduit connecting the end of said closed portion remote from said head with said other end of the casing, an inlet conduit connected to the end of said closed portion adjacent said valve head, a source of hydraulic fluid, means including a pump connecting said source to said inlet conduit, a relief valve bypassing said pump, a bleed conduit connected to said end of said closed portion adjacent said valve head, a valve connecting said inlet conduit and said bleed conduit, and a return line connecting the junction between said last-mentioned valve and said bleed line with said source, said return line including a flow indicating device.

7. A valve constructed in accordance with claim 6 in which the flow indicating device includes a spinner positioned in the path of flow of fluid through said return line, and a transparent plate permitting movement of the spinner to be observed.

8. A valve comprising, in combination, an elongated valve casing, means for securing said casing to a container so that one end of said casing is positioned within said container, a valve seat in said casing, a support secured within said casing, a valve head mounted in said support for movement toward and away from said valve seat, an opening to the container in said one end of the casing, a spring connecting said valve head and said support and arranged to cause the valve head to assume a position spaced from said valve seat, the strength of said spring being adjusted so that an excess flow of fluid from said container through said opening, said valve seat, and the other end of said casing causes the valve head to move into engagement with the valve seat against the force of said spring, a pressure-receiving member slidable in a closed portion of said casing, a plunger slidable within said closed portion having one end thereof connected to said pressure-receiving member, and having its other end engageable with said valve head, the cross-sectional area of said member being greater than the cross-sectional area of said valve head, a conduit connecting the end of said closed portion remote from said head with said other end of the casing, an inlet conduit connected to the end of said closed portion adjacent said valve head, a source of hydraulic fluid, means including a pump connecting said source to said inlet conduit, a relief valve bypassing said pump, a bleed conduit connected to said end of said closed portion adjacent said valve head, a valve connecting said inlet conduit and said bleed conduit, a return line connecting the junction between said last-mentioned valve and said bleed line with said source, said return line including a flow indicating device, the other end of said casing having an annular recessed portion formed therein and positioned downstream of said valve seat on a portion of the casing adapted to be mounted outside said conductor.

9. A valve comprising, in combination, a generally cylindrical metal casing, one end of said casing being constructed and arranged to define a valve seat, the other end of said casing defining a housing for a valve head assembly, a spider secured interiorly of said housing, a valve head assembly including a tubular stem mounted for axial movement in said spider toward and away from said valve seat, a valve head secured to said stem, and a spring urging said valve head to a position spaced from said valve seat, at which position a fluid pressure differential created by an excess flow of fluid from the housing toward said one end of the casing is adapted to force said valve head into engagement with said valve seat against the force of said spring, a plunger slidably mounted within said stem, a piston rod secured to said plunger, a piston secured to said rod which is movable longitudinally in a piston chamber defined by said casing, a line communicating with said chamber to admit hydraulic fluid thereto, thereby to move said piston in such direction as to cause the plunger to lift the valve head away from the valve seat, a line for bleeding hydraulic fluid from said piston chamber to permit said piston and said plunger to assume an intermediate position wherein the position of the valve head is controlled by said spring and is independent of the position of said plunger, a storage vessel for hydraulic fluid, a pump connected to said vessel and said inlet line to pump hydraulic fluid to said inlet line, a relief valve bypassing said pump, a valve connecting said inlet line and said bleed line, and a return line connecting the junction between said last-mentioned valve and said bleed line with said vessel, said return line including a flow indicating device.

10. A valve constructed in accordance with claim 9 in which the flow indicating device includes a spinner positioned in the path of flow of fluid through said return line and a transparent plate permitting movement of the spinner to be observed.

11. A valve comprising, in combination, a generally cylindrical metal casing, one end of said casing being constructed and arranged to define a valve seat, the other end of said casing defining a housing for a valve head assembly, a spider secured interiorly of said housing, a valve head assembly including a tubular stem mounted for axial movement in said spider toward and away from said valve seat, a valve head secured to said stem, and a spring urging said valve head to a position spaced from said valve seat, at which position a fluid pressure differential created by an excess flow of fluid from the housing toward said one end of the casing is adapted to force said valve head into engagement with said valve seat against the force of said spring, a plunger movable axially within said stem, a piston rod secured to said plunger, a piston secured to said rod which is movable longitudinally in a piston chamber defined by said casing, a line communicating with said chamber to admit hydraulic fluid thereto, thereby to move said piston in such direction as to cause the plunger to lift the valve head away from the valve seat, means defining a longitudinally-extending cylindrical barrel in said casing spaced from said piston rod and located between said piston and said valve head, a cylindrical member movable in said barrel toward and away from said piston, one end of said member having a hooked arm protruding therefrom and extending toward said piston, the other end of said member being encircled by a sealing gasket, cooperating ports communicating with an intermediate region of said barrel, one of said cooperating ports leading to said piston chamber and the other cooperating port leading to a bleed line, a hooked arm depending from said piston, the hooked portion of said last-mentioned arm cooperating with the hooked portion of the arm extending from said cylindrical member to form a lost motion connection therewith, a ring of packing material encircling said cylindrical member, and an adjusting screw engaging said ring of packing material to force it into frictional engagement with said cylindrical member, said casing having an annular recess formed therein at a position downstream of the location of said valve seat.

12. A valve comprising, in combination, a generally cylindrical metal casing, one end of said casing being constructed and arranged to define a valve seat, the other end of said casing defining a housing for a valve head assembly, a spider secured interiorly of said housing, a valve head assembly including a tubular stem mounted for axial movement in said spider toward and away from said valve seat, a valve head secured to said stem, and a spring urging said valve head to a position spaced from said valve seat, at which position a fluid pressure differential created by an excess flow of liquid from the housing toward said one end of the casing is adapted to force said valve head into engagement with said valve seat against the force of said spring, a plunger slidably mounted within said valve stem, a piston rod secured to said plunger, a piston secured to said rod which is movable longitudinally in a piston chamber defined by said casing, an inlet line communicating with one end of said chamber to admit hydraulic fluid thereto, thereby to move said piston in such direction as to cause the plunger to lift the valve head away from the valve seat, means defining a longitudinally extending cylindrical barrel in said casing spaced from said piston rod and located between said piston and said valve head, a cylindrical member movable in said barrel toward and away from piston, one end of said member having a hooked arm protruding therefrom and extending toward said piston, the other end of said member being encircled by a sealnig gasket, cooperating ports communicating with an intermediate region of said barrel, one of said cooperating ports leading to said piston chamber and the other cooperating port leading to a bleed line, a hooked arm depending from said piston, the hooked portion of said last-mentioned arm cooperating with the hooked portion of the arm extending from said cylindrical member to form a lost motion connection therewith, means frictionally engaging said cylindrical member, a spring connected to said casing and said piston to force said piston and said plunger toward said valve seat, a conduit connecting a portion of the casing downstream of the valve seat with the other end of said piston chamber, the cross-sectional area of said piston being greater than the cross-sectional area of said valve head, a storage vessel for hydraulic fluid, a pump connected to said vessel and said inlet line to pump hydraulic fluid to said inlet line, a relief valve bypassing said pump, a valve connecting said inlet line and said bleed line, and a return line connecting the junction between said last-mentioned valve and said bleed line with said vessel, said return line including a flow indicating device.

13. A valve constructed in accordance with claim 12 in which the flow indicating device includes a spinner positioned in the path of flow of fluid through said return line and a transparent plate permitting movement of the spinner to be observed.

References Cited in the file of this patent

UNITED STATES PATENTS

| | | |
|---|---|---|
| 1,796,941 | Pottenger, Jr. | Mar. 17, 1931 |
| 2,069,340 | White | Feb. 2, 1937 |
| 2,160,766 | Thomason | May 30, 1939 |
| 2,492,165 | Mapes | Dec. 27, 1949 |
| 2,543,566 | Brown | Feb. 27, 1951 |